(12) United States Patent
Sun et al.

(10) Patent No.: US 12,058,139 B2
(45) Date of Patent: Aug. 6, 2024

(54) METHOD FOR IMPLEMENTING USER PLANE SECURITY POLICY, APPARATUS, AND SYSTEM

(71) Applicant: HUAWEI TECHNOLOGIES CO., LTD., Shenzhen (CN)

(72) Inventors: Haiyang Sun, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 519 days.

(21) Appl. No.: 17/174,749

(22) Filed: Feb. 12, 2021

(65) Prior Publication Data

US 2021/0168151 A1 Jun. 3, 2021

Related U.S. Application Data

(63) Continuation of application No. PCT/CN2019/099309, filed on Aug. 5, 2019.

(30) Foreign Application Priority Data

Aug. 13, 2018 (CN) .......................... 201810918762.8

(51) Int. Cl.
 *H04L 9/40* (2022.01)
 *H04L 67/61* (2022.01)
(52) U.S. Cl.
 CPC .......... *H04L 63/102* (2013.01); *H04L 63/164* (2013.01); *H04L 63/20* (2013.01); *H04L 67/61* (2022.05)
(58) Field of Classification Search
 CPC ........ H04L 63/102; H04L 67/61; H04L 63/20
 (Continued)

(56) References Cited

U.S. PATENT DOCUMENTS 11,057,775 B2 7/2021 Zhang et al.
2016/0183156 A1* 6/2016 Chin ................... H04L 61/5007
370/331

(Continued)

FOREIGN PATENT DOCUMENTS

| CN | 104813708 A | 7/2015 |
| CN | 104937964 A | 9/2015 |
| CN | 107566115 A | 1/2018 |

OTHER PUBLICATIONS

Qualcomm Incorporated et al., "Architectural solution for User Plane (UP) Security policy and User Plane Integrity Protection", SA WG2 Meeting #S2-125 S2-181260, Jan. 22-26, 2018, Gothenburg, Sweden, TOTAL 4 PAGES.

(Continued)

*Primary Examiner* — Anthony D Brown
(74) *Attorney, Agent, or Firm* — HAUPTMAN HAM, LLP

(57) ABSTRACT

This application discloses a method for implementing a user plane security policy, an apparatus, and a system. In an implementation, a terminal apparatus may associate or establish a PDU session based on user plane security indication information that is of an application and that is sent by a network device. In another implementation, a PCF adds an obtained user plane security attribute requirement of the application to a PCC rule and sends the PCC rule to an SMF, so that the SMF performs QoS flow binding based on the user plane security attribute requirement. According to the foregoing method, the user plane security attribute requirement of the application can be met.

7 Claims, 15 Drawing Sheets

(58) Field of Classification Search
USPC .................................................. 726/26–30
See application file for complete search history.

(56) References Cited

U.S. PATENT DOCUMENTS

| 2018/0198867 A1 | 7/2018 | Dao et al. |
| 2018/0227872 A1 | 8/2018 | Li et al. |
| 2021/0211960 A1* | 7/2021 | Ryu .................. H04W 36/0011 |

OTHER PUBLICATIONS

NEC, "UP integrity protection granularity", 3GPP TSG-RAN WG2 #101 R2-1803611, Athens, Greece, Feb. 26, Mar. 2, 2018, total 6 pages.

Qualcomm Incorporated, "User plane security policy", 3GPP TSG-WG2 Meeting #126 S2-182009, Montreal, Canada, Feb. 26-Mar. 2, 2018, TOTAL 27 PAGES.

NEC, "Further update to User Plane security impact on NG interface", 3GPP TSG-RAN3#99 R3-180878, Athens, Greece, Feb. 26-Mar. 2, 2018, total 4 pages.

LG Electronics, "TS 23.502: clarification on QoS parameters", SA WG2 Meeting #124 S2-178453, Nov. 27-Dec. 1, 2017, Reno, USA, total 24 pages.

Oppo et al., "Adding PRA related description in 23.502", SA WG2 Meeting #124 S2-179174, Nov. 27-Dec. 1, 2017, Reno, Nevada, USA, total 19 pages.

Chinese Office Action issued in corresponding Chinese Application No. 201810918762.8, dated Feb. 9, 2021, pp. 1-10.

International Search Report issued in corresponding International Application No. PCT/CN2019/099309, dated Oct. 30, 2019.

Huawei; Hisilicon, A solution for UP security negotiation. 3GPP TSG SA WG3 (Security) Meeting #87, May 15-19, 2017, Ljubljana,Slovenia, S3-171606, 3 pages.

Huawei, Hisilicon, Definition and Clarification for Security Policy Control Function. 3GPP TSG SA WG3 (Security) Meeting #85, Nov. 7-11, 2016 Santa Cruz de Tenerife (Spain), S3-161987, 5 pages.

Ericsson, Clause 6 (user plane security security policy). 3GPP TSG SA WG3 (Security) Meeting #90, Jan. 22-26, 2018, Gothenburg, Sweden, S3-180286, 3 pages.

Partial Supplementary European Search Report issued in corresponding European Application No. 19850342.7, dated Aug. 4, 2021, pp. 1-17, European Patent Office, Munich, Germany.

* cited by examiner

METHOD FOR IMPLEMENTING USER PLANE SECURITY POLICY, APPARATUS, AND SYSTEM

CROSS-REFERENCE TO RELATED APPLICATIONS

This application is a continuation of International Application No. PCT/CN2019/099309 filed on Aug. 5, 2019, which claims priority to Chinese Patent Application No. 201810918762.8, filed on Aug. 13, 2018, The disclosures of the aforementioned applications are hereby incorporated by reference in their entireties.

TECHNICAL FIELD

This application relates to the field of wireless communications technologies, and in particular, to a method for implementing a user plane security policy, an apparatus, and a system.

BACKGROUND

A terminal may select, based on a transmission requirement of an application, a packet data unit (PDU) session used to transmit a data packet of the application. If there is no PDU session that meets the transmission requirement of the application in PDU sessions established by the terminal, the terminal may request to establish a new PDU session, to meet the transmission requirement of the application.

Different applications may have different user plane security policies. For example, an application needs to perform encryption and integrity protection on a data packet, or only needs to perform encryption on a data packet, or only needs to perform integrity protection on a data packet.

However, when selecting a PDU session for an application, the terminal does not consider a user plane security policy of the application. When a network device executes a security policy and establishes a PDU session, a corresponding user plane security policy is set for the PDU session. The user plane security policy is determined based on a slice in which the PDU session is located and a data network (DN) in which the PDU session is located. All data packets transmitted in the PDU session use a same user plane security policy, and requirements of different applications are not considered. For example, an application A has implemented encryption at an application layer, and if the network device performs encryption again, unnecessary load and a latency are increased. For another example, an application B has a relatively high requirement on a latency, but performing the integrity protection on a data packet causes a relatively long latency. This results in a policy conflict.

SUMMARY

This application provides a method for implementing a user plane security policy, an apparatus, and a system, to meet a user plane requirement of an application.

According to a first aspect, an embodiment of this application provides a method for implementing a user plane security policy. The method includes.

A terminal apparatus receives user plane security indication information sent by a network device. The user plane security indication information is used to indicate a user plane security attribute requirement of an application.

The terminal apparatus associates or establishes a PDU session based on the user plane security attribute requirement.

In the foregoing method, when selecting an associated PDU session for the application based on the user plane security indication information of the application, the terminal considers the user plane security attribute requirement of the application, so that the associated PDU session conforms to the user plane security attribute requirement of the application. This helps avoid unnecessary security protection or security protection that does not conform to the requirement of the application.

In a possible implementation, when the terminal apparatus establishes the PDU session based on the user plane security attribute requirement and when a PDU session that meets the user plane security attribute requirement of the application does not exist in established PDU sessions, the terminal apparatus sends PDU session establishment request information, to request to establish a PDU session that meets the user plane security attribute requirement of the application. The terminal apparatus establishes the PDU session based on the user plane security attribute requirement, and associates the application with the established PDU session, so that the associated PDU session can meet the user plane security attribute requirement of the application.

In a possible implementation, the PDU session establishment request information includes a user plane security parameter determined based on the user plane security indication information.

In a possible implementation, when the terminal apparatus associates the PDU session based on the user plane security attribute requirement and when a first PDU session that meets the user plane security attribute requirement of the application exists in established PDU sessions, the terminal apparatus transmits data of the application in the first PDU session.

In a possible implementation, the user plane security indication information is carried in a UE route selection policy (URSP) and is sent to the terminal apparatus. The terminal apparatus selects the PDU session based on the URSP, and includes the user plane security indication information of the application in the URSP, so that an existing protocol is slightly modified and implementation is easy.

According to a second aspect, an embodiment of this application provides a method for implementing a user plane security policy. The method includes:

A policy control function PCF sends user plane security indication information. The user plane security indication information is used by a terminal apparatus to associate or establish a PDU session.

In the foregoing method, the user plane security indication information sent by the PCF may be sent to the terminal apparatus through another network element, so that the terminal apparatus associates the PDU session based on the user plane security indication information, and the associated PDU session conforms to a user plane security attribute requirement of an application.

In a possible implementation, the foregoing method further includes: The PCF receives a policy rule request sent by a session management function (SMF). The request includes user plane security parameter information, and the user plane security parameter information is determined by the terminal apparatus based on the user plane security indication information of the application. The PCF determines user plane security policy information based on the user plane security parameter information, and sends the determined user plane security policy information to the SMF. After receiving the policy rule request, the PCF sends the user plane security parameter information to the SMF, so that the SMF and another network element can execute a corresponding security policy for the PDU session based on the user plane security parameter information, to ensure the user plane security attribute requirement of the application.

In a possible implementation, the PCF determines the user plane security indication information of the application based on subscription information of the terminal apparatus.

In a possible implementation, the user plane security indication information is carried in a UE route selection policy (URSP) and is sent to the terminal apparatus.

According to a third aspect, an embodiment of this application provides a method for implementing a user plane security policy. The method includes: A unified data management (UDM) receives PDU session registration information sent by an SMF. The registration information includes a user plane security parameter from a terminal apparatus.

When the user plane security parameter is a parameter that is permitted to be configured for a PDU session of the terminal apparatus, the UDM sends, to the SMF, indication information indicating that the PDU session is permitted to be established.

When the user plane security parameter is not a parameter that is permitted to be configured for a PDU session of the terminal apparatus, the UDM sends, to the SMF, indication information indicating that the PDU session is refused to be established.

In the foregoing method, the PDU session registration information sent by the SMF includes the user plane security parameter, so that the established PDU session can meet a user plane security attribute requirement of an application. The UDM may perform authentication on the user plane security parameter, and if the parameter is a parameter that is permitted to be configured for the PDU session of the terminal apparatus, the PDU session is permitted to be established, to ensure that the established PDU session is consistent with subscription information of the terminal apparatus.

According to a fourth aspect, an embodiment of this application provides a method for implementing a user plane security policy. The method includes: A PCF receives user plane security attribute requirement information that is of an application and that is sent by an application function (AF). The user plane security attribute requirement information is used to indicate a user plane security attribute requirement of the application. The PCF sends user plane security parameter information of a service data flow (SDF) to an SMF. The user plane security parameter information of the SDF is determined based on the user plane security attribute requirement of the application.

In the foregoing method, the PCF may obtain the user plane security attribute requirement information of the application from the AF, and send the user plane security attribute requirement information of the application to the SMF, so that the SMF can perform QoS flow binding based on the user plane security attribute requirement of the application, to meet the user plane security attribute requirement of the application.

According to a fifth aspect, an embodiment of this application provides a method for implementing a user plane security policy. The method includes: An SMF receives user plane security parameter information that is of an SDF and that is sent by a PCF. The user plane security parameter information of the SDF is included in a policy and charging control (PCC) rule. The user plane security parameter information of the SDF is determined based on a user plane security attribute requirement of an application, and the user plane security parameter information is used to indicate a user plane security parameter. The SMF binds the PCC to a quality of service flow (QoS flow) based on at least the user plane security parameter of the SDF.

In a possible implementation, when a first QoS flow that conforms to the user plane security parameter exists in established QoS flows, the SMF binds the SDF of the application to the first QoS flow; and/or when a first QoS flow that conforms to the user plane security parameter does not exist in established QoS flows, the SMF requests to establish a second QoS flow, and the second QoS flow conforms to the user plane security parameter.

In the foregoing method, the SMF receives the PCC rule that includes the user plane security parameter information, so that the SMF can perform QoS flow binding based on user plane security indication information of the application. To be specific, the SMF binds the SDF of the application to the QoS flow that meets the user plane security attribute requirement of the application, to meet the user plane security attribute requirement of the application.

According to a sixth aspect, an embodiment of this application provides a terminal apparatus. The terminal apparatus includes a processor, a memory, and a communications interface, configured to implement the method according to any one of the possible implementations of the first aspect.

According to a seventh aspect, an embodiment of this application provides a PCF. The PCF includes a processor, a memory, and a communications interface, configured to implement the method according to any one of the possible implementations of the second aspect.

According to an eighth aspect, an embodiment of this application provides a UDM. The UDM includes a processor, a memory, and a communications interface, configured to implement the method according to any one of the possible implementations of the third aspect.

According to a ninth aspect, an embodiment of this application provides a PCF. The PCF includes a processor, a memory, and a communications interface, configured to implement the method according to any one of the possible implementations of the fourth aspect.

According to a tenth aspect, an embodiment of this application provides an SMF. The SMF includes a processor, a memory, and a communications interface, configured to implement the method according to any one of the possible implementations of the fifth aspect.

According to an eleventh aspect, an embodiment of this application provides a communications system. The communications system includes the terminal apparatus according to any one of the possible implementations of the sixth aspect, the PCF according to any one of the possible implementations of the seventh aspect, and the UDM according to any one of the possible implementations of the eighth aspect.

According to a twelfth method, an embodiment of this application provides a communications system. The communications system includes the PCF according to any one of the possible implementations of the ninth aspect and the SMF according to any one of the possible implementations of the tenth aspect.

According to a thirteenth aspect, an embodiment of this application provides a computer-readable storage medium. The computer-readable storage medium stores a computer instruction. When the instruction is run on a computer, the computer is enabled to perform the method according to any one of the possible implementations of the first aspect to the fifth aspect.

DESCRIPTION OF EMBODIMENTS

To make objectives, technical solutions, and advantages of this application clearer, the following further describes this application in detail with reference to the accompanying drawings.

Figure 1:
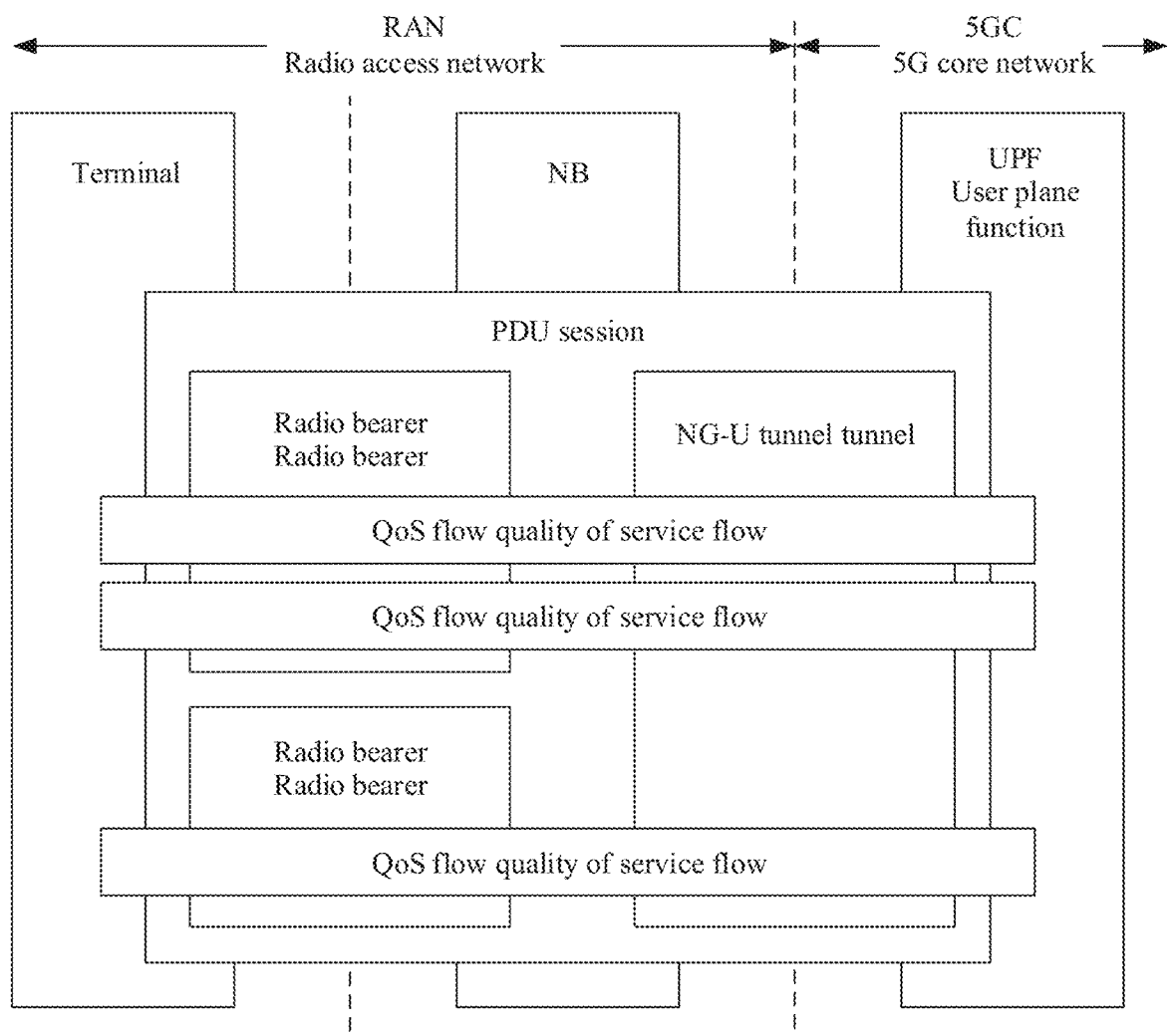
FIG. 1 is a QoS architecture according to an embodiment of this application.

In 5th generation mobile communications (5G) new radio (NR), to ensure end-to-end quality of service (QoS), a QoS architecture based on a quality of service flow (QoS flow) is provided, as shown in FIG. 1. One terminal apparatus may establish one or more PDU sessions with a 5G core network. A radio access network (RAN) establishes one or more data radio bearers (DRB) for each PDU session. One DRB includes one or more QoS flows, each QoS flow is identified by one QoS flow identifier (QFI), and the QFI uniquely identifies one QoS flow in one PDU session. Same transmission processing is performed on data packets transmitted in a same QoS flow, for example, by using a same scheduling policy and admission threshold.

In 5G, the radio access network (RAN) performs PDU session granularity control on user plane security. A PDU session establishment process may be shown in FIG. 2A, FIG. 2B and FIG. 2C, and include the following steps.

Step 201. A terminal sends a PDU session establishment request to an AMF.

Step 202. The AMF selects an SMF.

Step 203. The AMF sends the PDU session establishment request to the selected SMF.

Step 204. The SMF registers with a UDM, and obtains, from the UDM, subscription information of a network slice and a DN in which a PDU session requested to be established is located. The subscription information includes a user plane security policy.

Step 205. The SMF sends a PDU session establishment request response to the AMF. The response is used to indicate whether the PDU session is permitted to be established. If the PDU session is refused to be established, the response may carry a cause for refusing the establishment.

Step 206. PDU session authentication/authorization.

Step 207. The SMF selects a PCF. The SMF requests to obtain a PCC rule of the PDU session from the selected PCF. The SMF may obtain a dynamic user plane security policy of the PDU session from the PCF.

Step 208. The SMF selects a UPF.

Step 209. The SMF reports session related information to the PCF, for example, an IP address of the terminal, an IP prefix, and a status of a trigger.

Step 210. The SMF sends tunnel information, PCC rule information, and the like to the UPF.

Step 211. The SMF sends a PDU session identifier (PDU session ID), session management information on an N2 interface (N2 SM information), and a session management container on an N1 interface (N1 SM container) to the AMF.

When a target receiver of the N2 SM information is the RAN, the N2 SM information is forwarded by the AMF to the RAN. When a target receiver of the N2 SM information is the terminal, the N2 SM information is transparently transmitted through the AMF and the RAN to the terminal. The N2 SM information includes user plane policy enforcement.

Step 212. The AMF sends a PDU session request to the RAN. The request includes the N2 SM information and a non-access stratum (NAS) message. The N2 SM information includes the user plane policy enforcement.

Steps 213 to 220 are other steps in the PDU session establishment process, and are not related to the embodiments of this application. Details are not described herein again. For details, refer to a related communication protocol.

In the foregoing PDU session establishment process, the UDM and the PCF do not have information about an application that is bound to the PDU session. Therefore, only the subscription information of the DN and the network slice is considered in a security policy executed by the RAN, and a user plane security attribute requirement of the application is not considered. However, some applications may have implemented application-layer encryption, and if a network device performs encryption again, unnecessary load and a latency are increased. Alternatively, some applications have a relatively high requirement on a latency, and if the network device performs integrity protection on a data packet of the application (this process takes a relatively long time), a relatively long latency is generated for the data packet.

To resolve the foregoing problem, the embodiments of this application provide a method for implementing a user plane security policy and an apparatus, to meet a user plane requirement of an application.

Figure 3A:
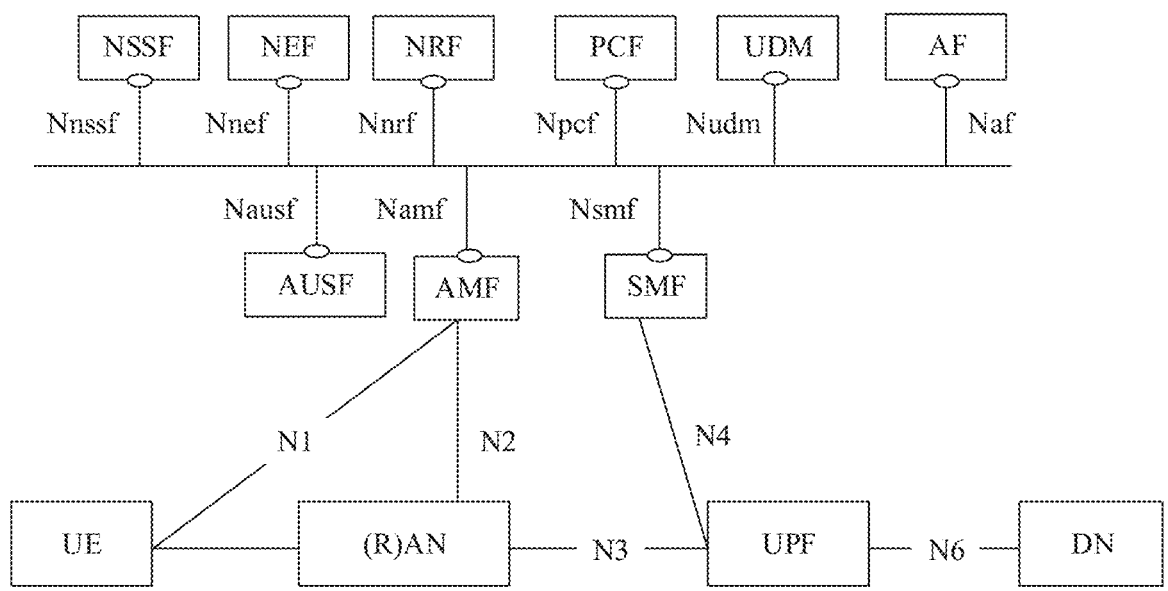
FIG. 3(a) to FIG. 3(f) each are a schematic diagram of a network architecture applicable to an embodiment of this application.
Figure 3B:
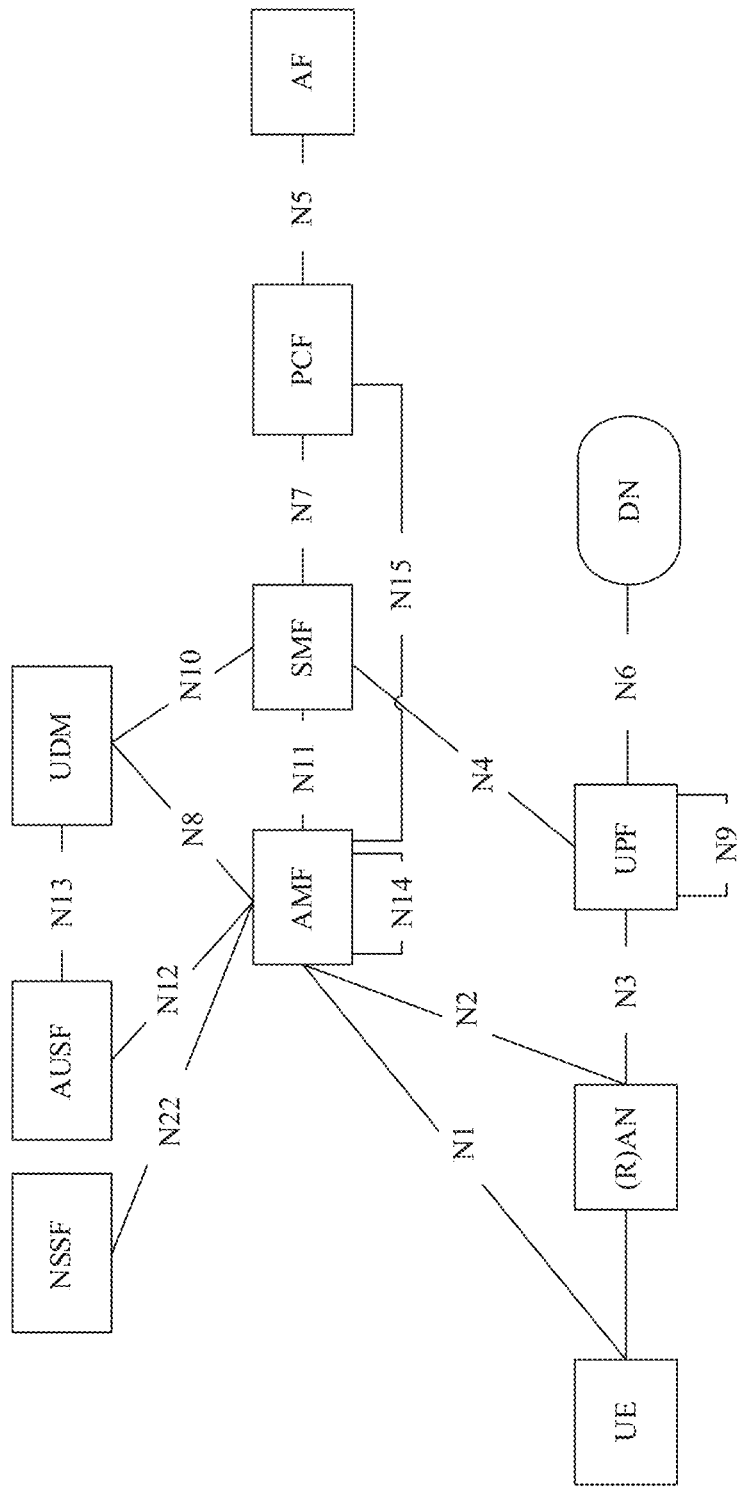
Figure 3C:
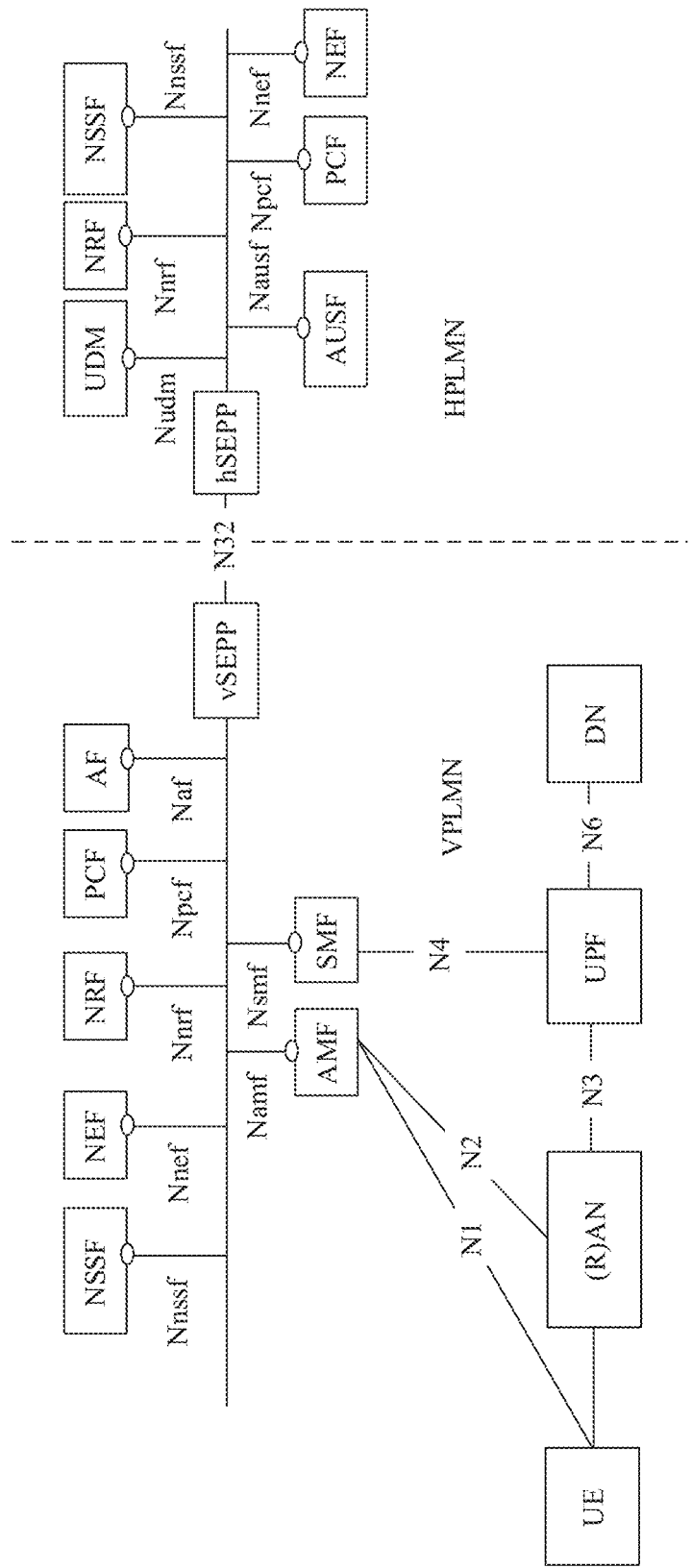
Figure 3D:
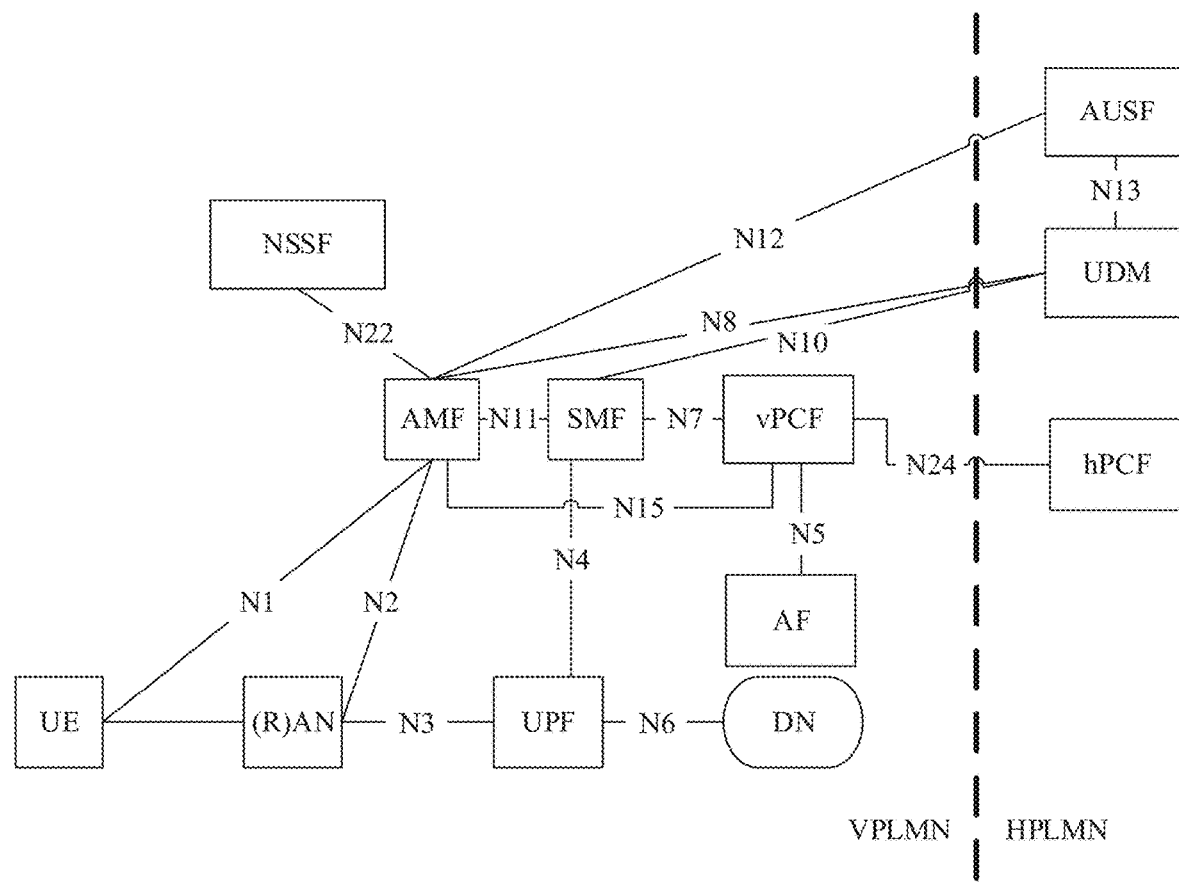
Figure 3:
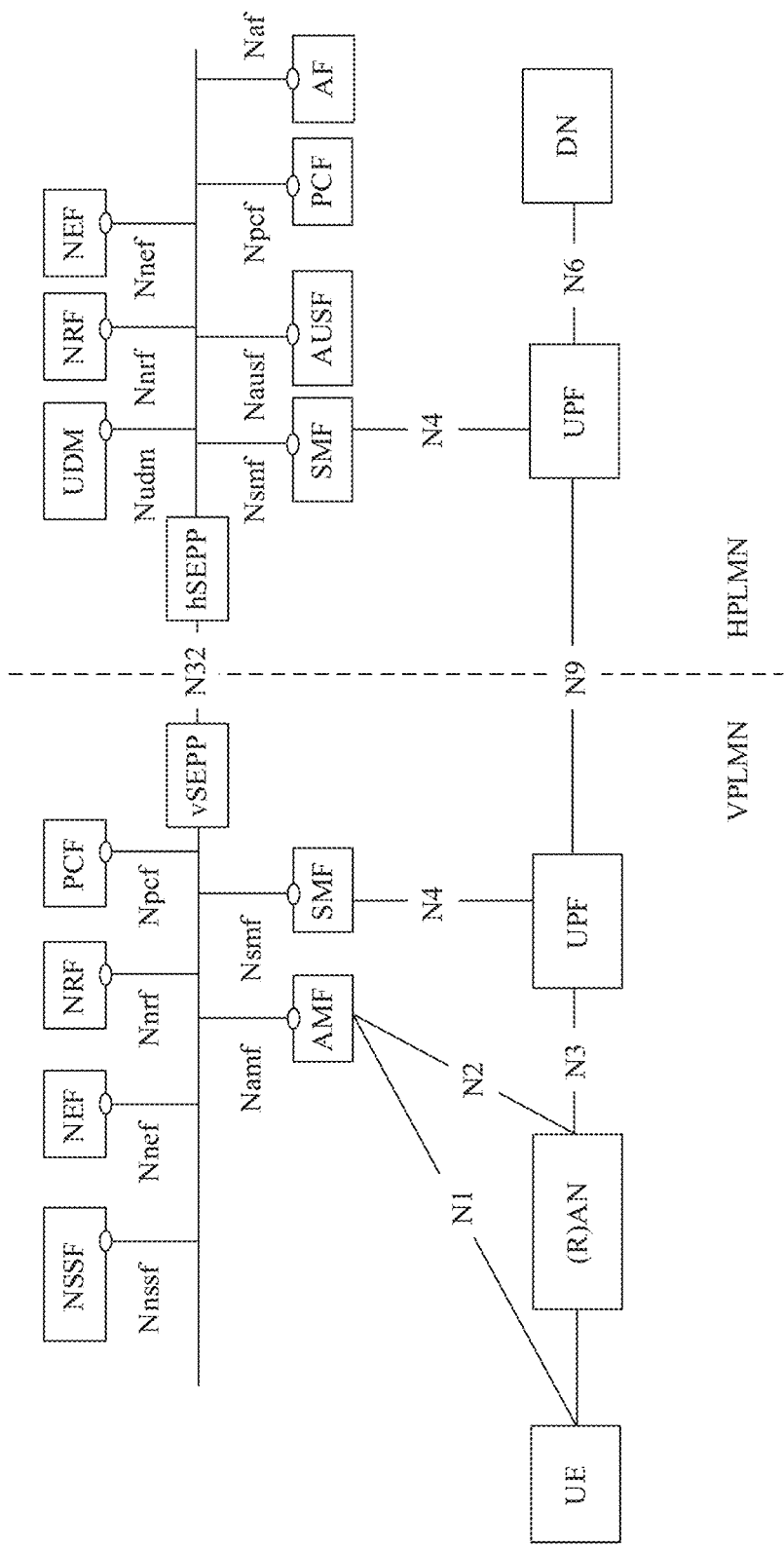
Figure 3F:
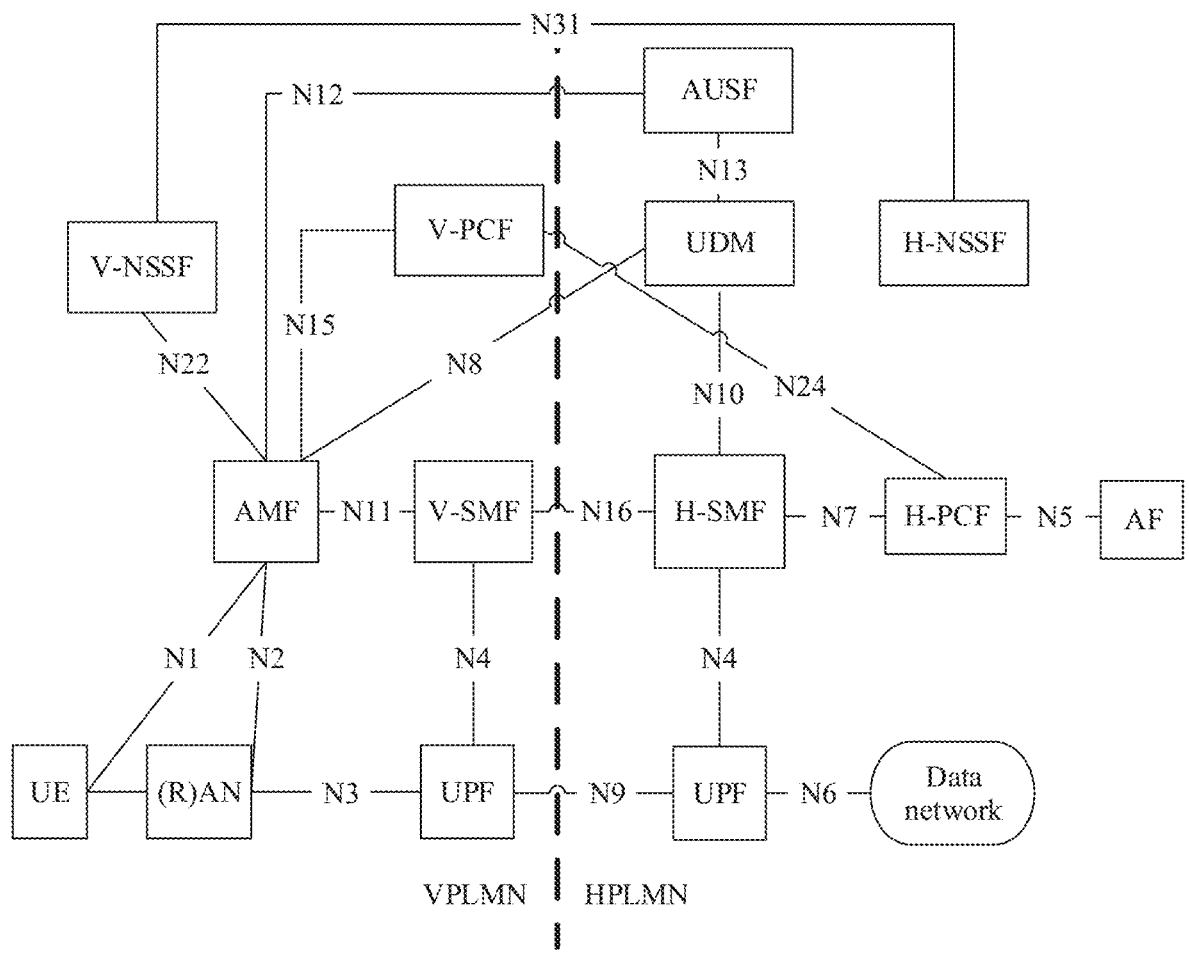

The method for implementing a user plane security policy provided in the embodiments of this application may be applied to non-roaming network architectures shown in FIG. 3(a) and FIG. 3(b), may be applied to local breakout roaming scenarios shown in FIG. 3(c) and FIG. 3(d), or may be applied to home routed roaming scenarios shown in FIG. 3(e) and FIG. 3(f).

An (R)AN is mainly used to control a terminal to access a mobile communications network in a wireless manner.

A UPF is mainly used for functions related to a user plane, for example, data packet routing and transmission, packet detection, service usage reporting, QoS processing, lawful interception, uplink packet detection, and downlink data packet storage.

An AMF is mainly used for functions related to access and mobility, for example, connection management, mobility management, registration management, access authentication and authorization, reachability management, and security context management.

An SMF is mainly used for functions related to a session, for example, session management (for example, session establishment, modification, and release, including tunnel maintenance between the UPF and an AN). UPF selection and control, service and session continuity (SSC) mode selection, and roaming.

A PCF is mainly used for functions related to a policy, for example, formulating a unified policy, providing a control policy, and obtaining policy decision-related subscription information from a unified data repository (UDR).

A network slice selection function (NSSF) is mainly used to select a group of network slice instances for a terminal, determine permitted network slice selection assistance information (NSSAI), determine an AMF set that can serve the terminal, and the like.

A network repository function (NRF) is mainly used for a service discovery function, and is mainly used to maintain NF texts of available network function (NF) instances and a service supported by the NF instance.

An application function (AF) interacts with a 3GPP core network to provide a service, including interacting with a network exposure function (NEF), interacting with a policy architecture, and the like.

An NEF is mainly used to securely expose services and capabilities provided by 3GPP network functions, including internally exposing the service and the capability, exposing the service and the capability to a third party, or the like, and converting or translating information exchanged with the AF and information exchanged with an internal network function, for example, an AF service identifier and 5G core network information, for example, a data network name (DNN), and single network slice selection assistance information (S-NSSAI).

A UDM is mainly used to support processing of a credential for authentication, user identity processing, access authorization, registration and mobility management, subscription management, short message management, or the like in a 3GPP authentication and key agreement mechanism.

An authentication server function (AUSF) is mainly used to interact with the UDM to obtain user information and execute authentication-related functions, for example, generate an intermediate key.

It should be understood that network architectures shown in FIG. 3(a) to FIG. 3(f) are merely examples, and do not constitute a limitation on the embodiments of this application. A network architecture to which the embodiments of this application may be applied may include more or fewer network elements than those shown in the figures.

Figure 4:
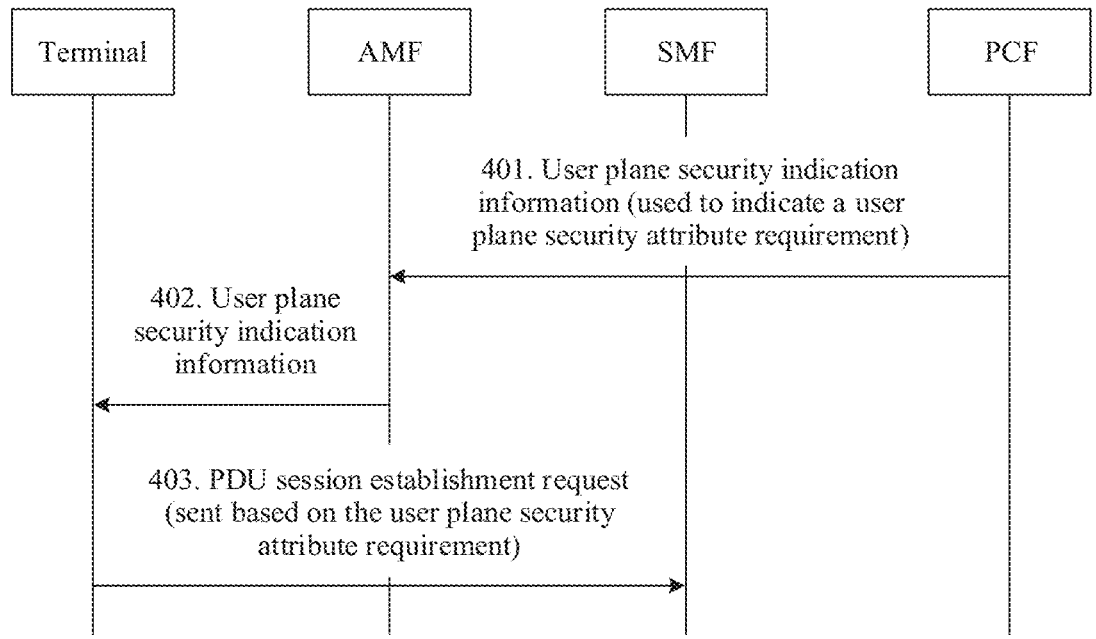
FIG. 4 is a schematic flowchart of a method for implementing a user plane security policy according to an embodiment of this application.

FIG. 4 is a schematic flowchart of a method for implementing a user plane security policy according to an embodiment of this application. As shown in the figure, the method may include the following steps.

Step 401. A PCF sends user plane security indication information of an application. The user plane security indication information is used to indicate a user plane security attribute requirement of the application, so that a terminal apparatus associates or establishes a PDU session based on the user plane security attribute requirement of the application.

In this embodiment of this application, the PCF may obtain user plane security attribute requirement of a subscribed application in advance. For example, both an application A and an application B subscribe to an operator, user plane security attribute requirement that is of the application A and that is obtained by the PCF is that integrity protection and encryption need to be performed on a data packet of the application A. and user plane security attribute requirement that is of the application B and that is obtained by the PCF is that encryption needs to be performed on a data packet of the application B.

Optionally, the user plane security indication information that is of the application and that is sent by the PCF is determined based on subscription information of the terminal apparatus. Specifically, the PCF may obtain the subscription information of the terminal apparatus in advance, and may include the user plane security attribute requirement of the application in the obtained subscription information of the terminal apparatus. The PCF determines the user plane security indication information based on the obtained user plane security attribute requirement.

In some embodiments, the PCF may include the user plane security attribute requirement of the application in a URSP, and send the URSP to the terminal apparatus. The terminal apparatus determines, based on the URSP, whether the detected application can be associated with an established PDU session, whether the detected application can be offloaded to a non-3GPP access outside of the PDU session, or whether the detected application can trigger an establishment of a new PDU session.

The URSP may include one or more URSP rules, as shown in Table 1.

TABLE 1

| Information name | | | PCF permitted to modify in URSP | |
|---|---|---|---|---|
| Information name | Description | Category | PCF permitted to modify in URSP | Scope |
| Description | | Category | Scope | |
| Route Selection Descriptor Precedence | Determines the order in which the Route Selection Descriptors are to be applied. | Mandatory (NOTE 1) | Yes | UE context |
| Route selection descriptor precedence | Determines the order in which the route selection descriptors are to be applied. | Mandatory | Yes | UE context |

TABLE 1-continued

| Information name Information name | Description Description | Category Category | PCF permitted to modify in URSP PCF permitted to modify in URSP | Scope Scope |
|---|---|---|---|---|
| Route selection components Route selection components | This part defines the route selection components. This part defines the route selection components | Mandatory (NOTE 2) | | |
| SSC mode selection SSC mode selection | One single value of SSC mode. One single value of SSC mode. | Optional Optional | Yes | UE context |
| Network Slice Selection Network slice selection | Either a single value or a list of values of S-NSSAI(s). Either a single value or a list of values of S-NSSAI(s). | Optional | Yes | UE context |
| DNN selection DNN selection | Either a single value or a. list of values of DNN(s). Either a single value or a list of values of DNN(s). | Optional | Yes | UE context |
| Non-seamless offload indication Non-seamless offload indication | Indicates if the traffic of the matching application is to be offloaded to non-3GPP access outside of a PDU Session. Indicates if the traffic of the matching application is to be offloaded to non-3GPP access outside of a PDU Session. | Optional (NOTE 3) | Yes | UE context |
| Access Type preference Access Type preference | Indicates the preferred Access Type (3GPP or non-3GPP) when the UE establishes a PDU Session for the matching application. Indicates the preferred Access Type (3GPP or non-3GPP) when the UE establishes a PDU Session for the matching application. | Optional | Yes | UE context |
| User Plane Security indication User plane security indication information | Indicates whether the matching application needs UP integrity protection or UP confidentiality protection. Indicates whether the matching application needs UP integrity protection or UP confidentiality protection. | Optional | Yes | UE context |

The user plane security indication is added in this embodiment of this application, and is used to indicate the user plane security attribute requirement of the application. It should be understood that information included in the URSP shown in Table 1 is merely an example. In actual application, the URSP may include more or less information than that in Table 1. For example, although the user plane security indication information in Table 1 is only used to indicate whether integrity protection or encryption protection is required. In actual application, the user plane security indication information may also be used to indicate that integrity protection and encryption protection are required, or indicate that other security protection is required.

The user plane security indication information is carried in the URSP and sent to the terminal apparatus, so that an existing protocol is slightly modified. Certainly, the user plane security indication information may alternatively be carried in another message and sent to the terminal.

In a possible design, the URSP may include user plane security indication information of all or some subscribed applications. Regardless of whether the applications corresponding to the user plane security indication information in the USRP are installed on the terminal apparatus, after the terminal apparatus downloads and installs these applications, a PDU session may be associated or established based on corresponding user plane security indication information. In another possible implementation, the PCF may obtain in advance subscribed applications installed on the terminal and includes user plane security indication information of these applications to the URSP for sending.

Step 402. After receiving the user plane security indication information sent by the PCF, an AMF may send the user plane security indication information to the terminal.

Step 403. The terminal apparatus associates or establishes the PDU session based on the user plane security attribute requirement.

In some embodiments, when a PDU session that meets the user plane security attribute requirement of the application does not exist in established PDU sessions, the terminal apparatus sends a PDU session establishment request, to request to establish a PDU session that meets the user plane security attribute requirement of the application.

Specifically, the PDU session establishment request sent by the terminal apparatus includes a user plane security parameter determined based on the user plane security indication information. Generally, a meaning indicated by the user plane security parameter generated by the terminal apparatus is consistent with a meaning of the user plane security attribute requirement that is of the application and that is indicated by the PCF. For example, if the user plane security indication information that is of the application and that is indicated by the PCF indicates that integrity protection is required, the user plane security parameter determined by the terminal apparatus based on the user plane security indication information also indicates that integrity protection is required. However, because signaling is different, a field indicating that integrity protection is required and a value of the field may be slightly different. Certainly, the terminal apparatus may alternatively generate the user plane security parameter based on the user plane security indication information and other information. For example, if the terminal apparatus has some security attribute requirements, the terminal apparatus generates the user plane security parameter based on the security attribute requirements of its own and the user plane security attribute requirement of the application, and a meaning of the user plane security parameter may also be different from the meaning of the user plane security indication information sent by the PCF.

Further, in a PDU session establishment process, after receiving the PDU session establishment request including the user plane security parameter, the AMF selects an SMF, and sends the PDU session establishment request to the selected SMF. The request carries the user plane security parameter. Then, the SMF may send PDU session registration information to a UDM. The registration information includes the user plane security parameter. The UDM determines whether the user plane security parameter included in the PDU session registration information is a PDU session configuration parameter that is permitted to be configured for the terminal apparatus. When the user plane security parameter included in the PDU session registration information is a PDU session configuration parameter that is permitted to be configured for the terminal apparatus, the UDM may send, to the SMF, indication information indicating that the PDU session is permitted to be established; or when the user plane security parameter included in the PDU session registration information is not a PDU session configuration parameter that is permitted to be configured for the terminal apparatus, the UDM may send, to the SMF, indication information indicating that the PDU session is refused to be established.

In addition, in the PDU session establishment process, the SMF may send a policy rule request to the PCF, to request the PCF to send a PCC rule of the PDU session requested to be established. The request also includes the user plane security parameter. The PCF determines user plane security policy information of the PDU session based on the user plane security parameter and sends the determined user plane security policy information to the SMF.

In some other embodiments, when a first PDU session that meets the user plane security attribute requirement of the application exists in established PDU sessions, the terminal apparatus may associate the first PDU session with the application. That is, the terminal apparatus transmits data of the application in the first PDU session.

In the foregoing embodiment of this application, when selecting an associated PDU session for the application based on the user plane security indication information that is of the application and that is sent by the PCF, the terminal considers the user plane security attribute requirement of the application, so that the associated PDU session conforms to the user plane security attribute requirement of the application and applications associated with a same PDU session have a same user plane security attribute requirement. This avoids a case in which a user plane security attribute of the PDU session does not conform to the application.

Figure 5:
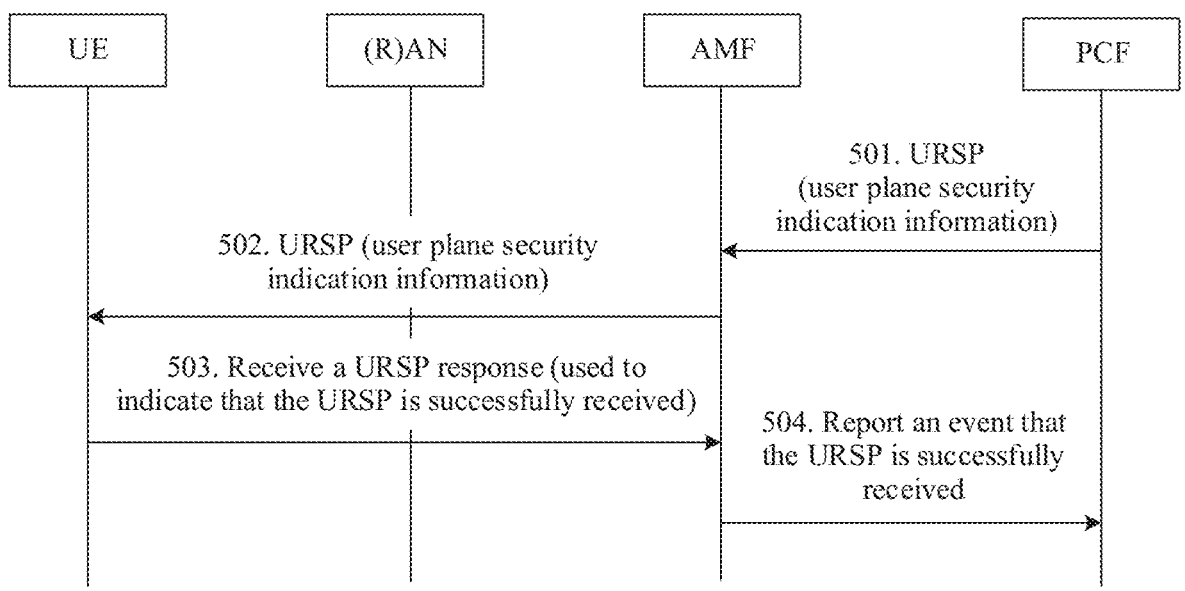
FIG. 5 and FIG. 6 each are a schematic flowchart of a specific embodiment according to an embodiment of this application.
Figure 6:
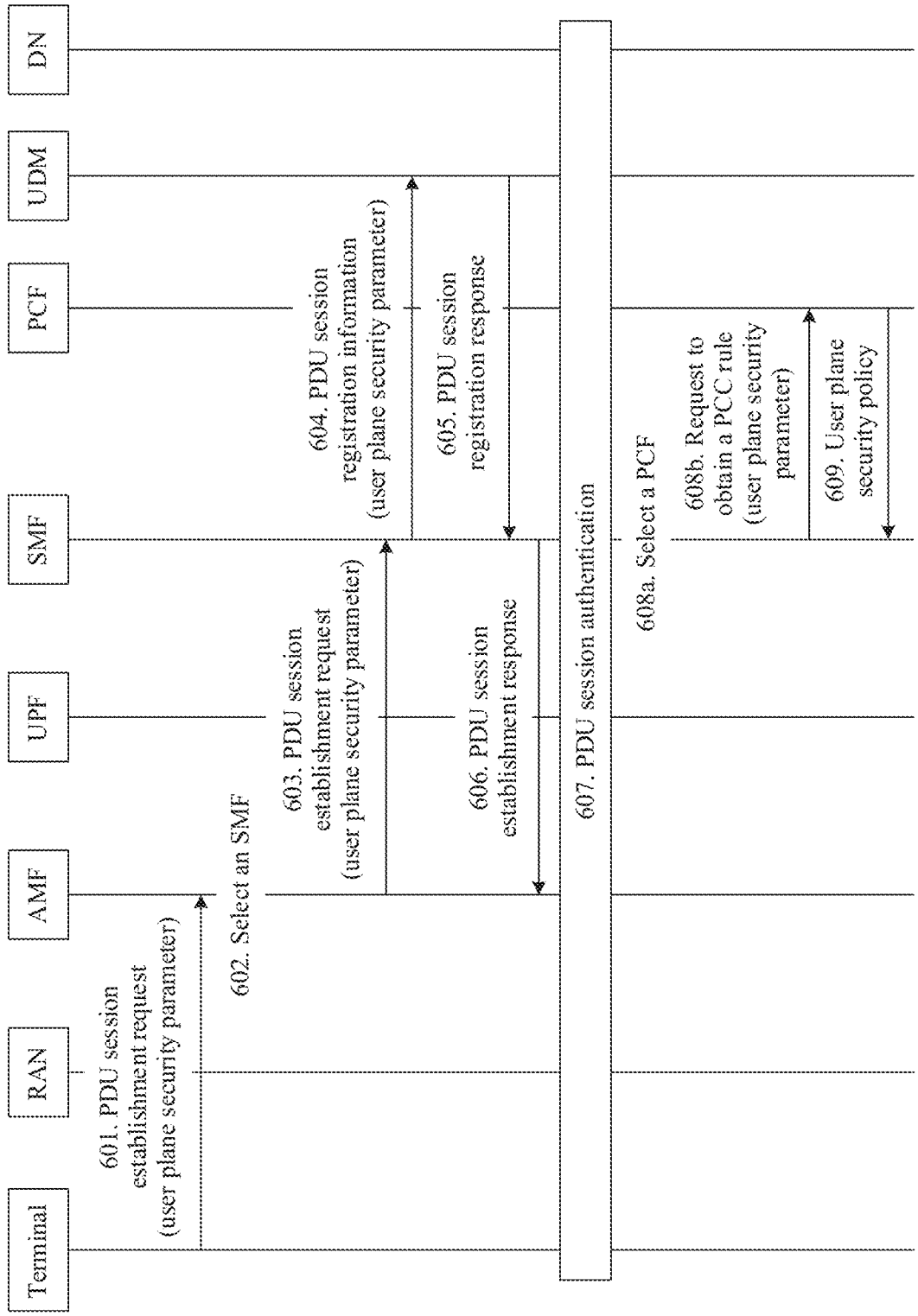

To describe the foregoing embodiment of this application more clearly, the following provides detailed descriptions with reference to FIG. 5 and FIG. 6.

FIG. 5 is a schematic diagram of an example of a URSP delivery process. As shown in the figure, the process may include the following steps.

Step 501. A PCF sends a URSP to an AMF. The URSP includes user plane security indication information that is of an application A and that is determined by the PCF based on subscription information.

Step 502. The AMF transparently transmits the URSP to a terminal apparatus. The URSP includes the user plane security indication.

Step 503. The terminal apparatus sends a response to the AMF, to indicate that the URSP is successfully received.

Step 504. The AMF reports, to the PCF, an event that the terminal successfully receives the URSP.

Further, the PCF may return an event report response to the AMF.

When using the application A, the terminal apparatus determines, based on the obtained user plane security indication information of the application A, that a PDU session that meets the user plane security attribute requirement of the application A does not exist in established PDU sessions, and initiates a PDU session establishment process. FIG. 6 is a schematic flowchart of an example of a PDU session establishment process. As shown in the figure, the process may include the following steps.

Step 601. A terminal apparatus sends a PDU session establishment request to an AMF.

Specifically, the terminal apparatus generates a user plane security parameter based on user plane security indication information of an application A, and includes the parameter in the PDU session establishment request, to request to establish a PDU session that meets a user plane security attribute requirement of the application A.

Step 602. The AMF selects an SMF.

Step 603. The AMF sends the PDU session establishment request to the selected SMF. The request includes the user plane security parameter.

Step 604. The SMF sends PDU session registration information to a UDM. The registration information includes the user plane security parameter.

Step 605. If determining that the user plane security parameter included in the registration information is a PDU session configuration parameter that is permitted to be configured for the terminal apparatus, the UDM returns a registration response to the SMF, to indicate that the PDU session is permitted to be established.

Otherwise, the UDM sends, to the SMF, indication information indicating that the PDU session is refused to be established. Further, the indication information may further include a refusal cause. That is, the user plane security parameter is not permitted.

Step 606. The SMF sends a PDU session establishment request response to the AMF.

If the UDM indicates that the PDU session is refused to be established in step 605, the response indicates that the AMF refuses to establish the PDU session. The response may further include the refusal cause.

Step 607. PDU session authentication/authorization.

Step 608. The SMF selects a PCF. The SMF requests to obtain a PCC rule of the PDU session from the selected PCF. The request includes the user plane security parameter.

Step 609. The PCF determines, based on the user plane security parameter, a user plane security policy for authorizing the PDU session, and sends the user plane security policy to the SMF.

Figure 2A:
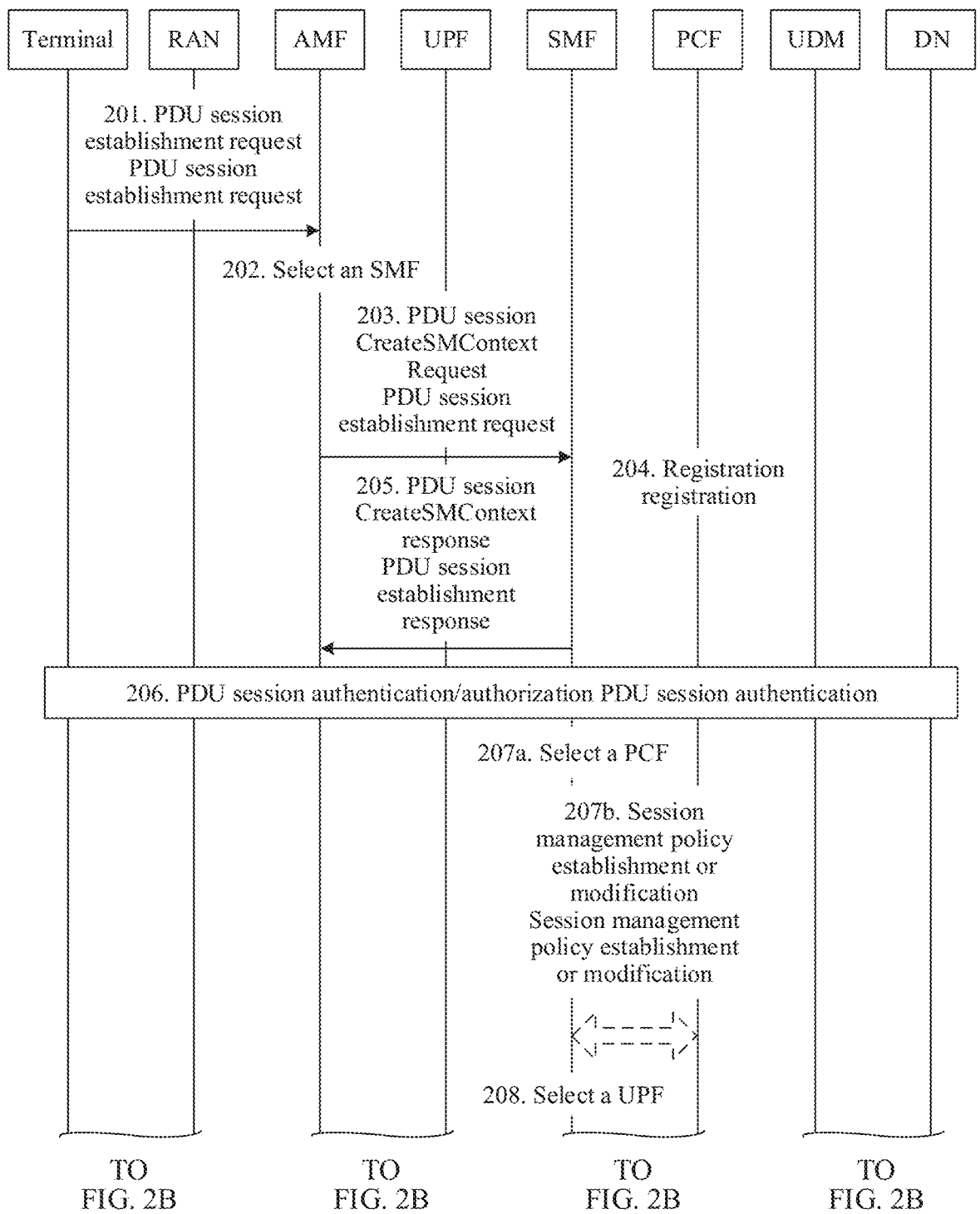
FIG. 2A, FIG. 2B and FIG. 2C show a PDU session establishment process in the current technology.
Figure 2B:
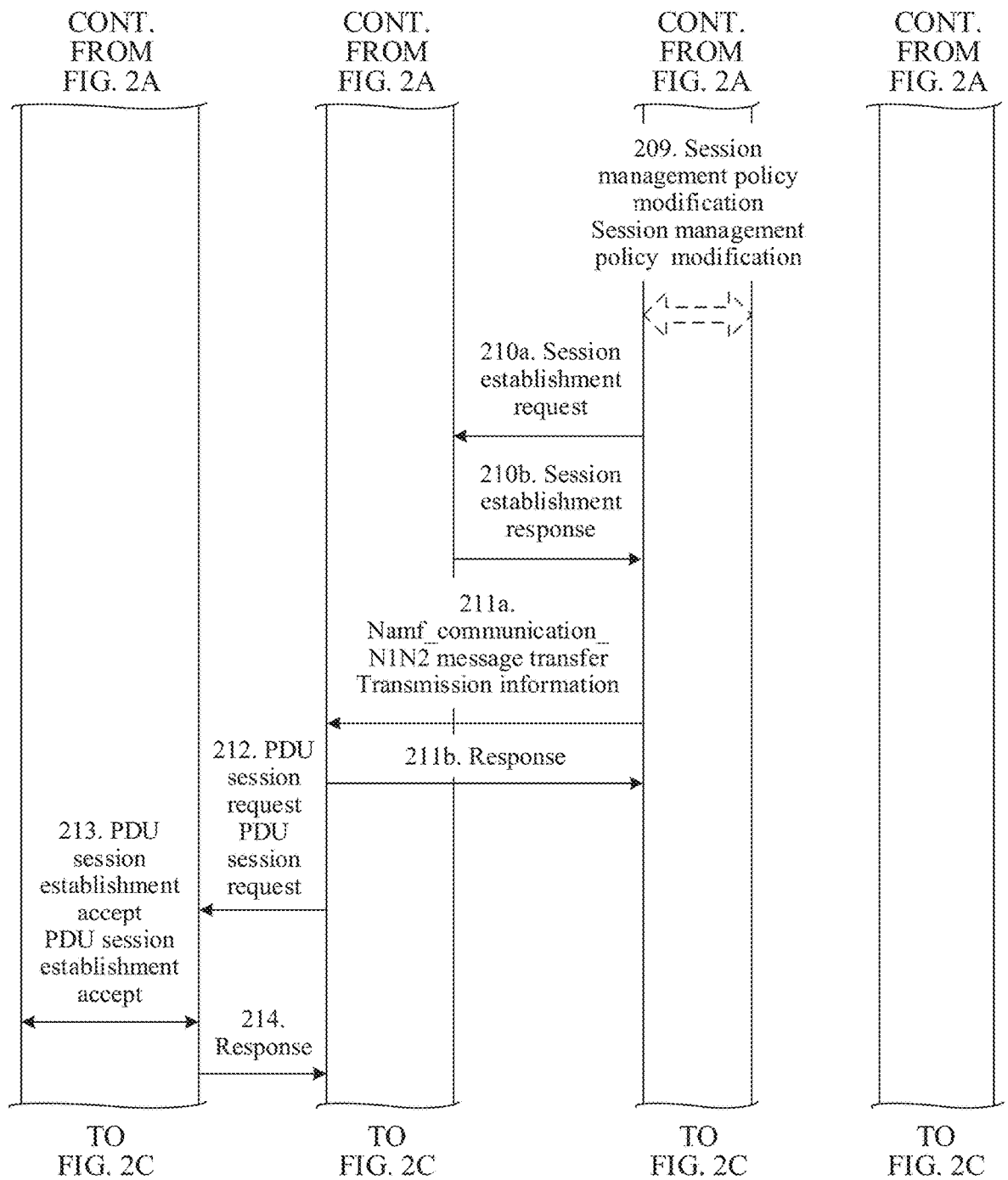
Figure 2C:
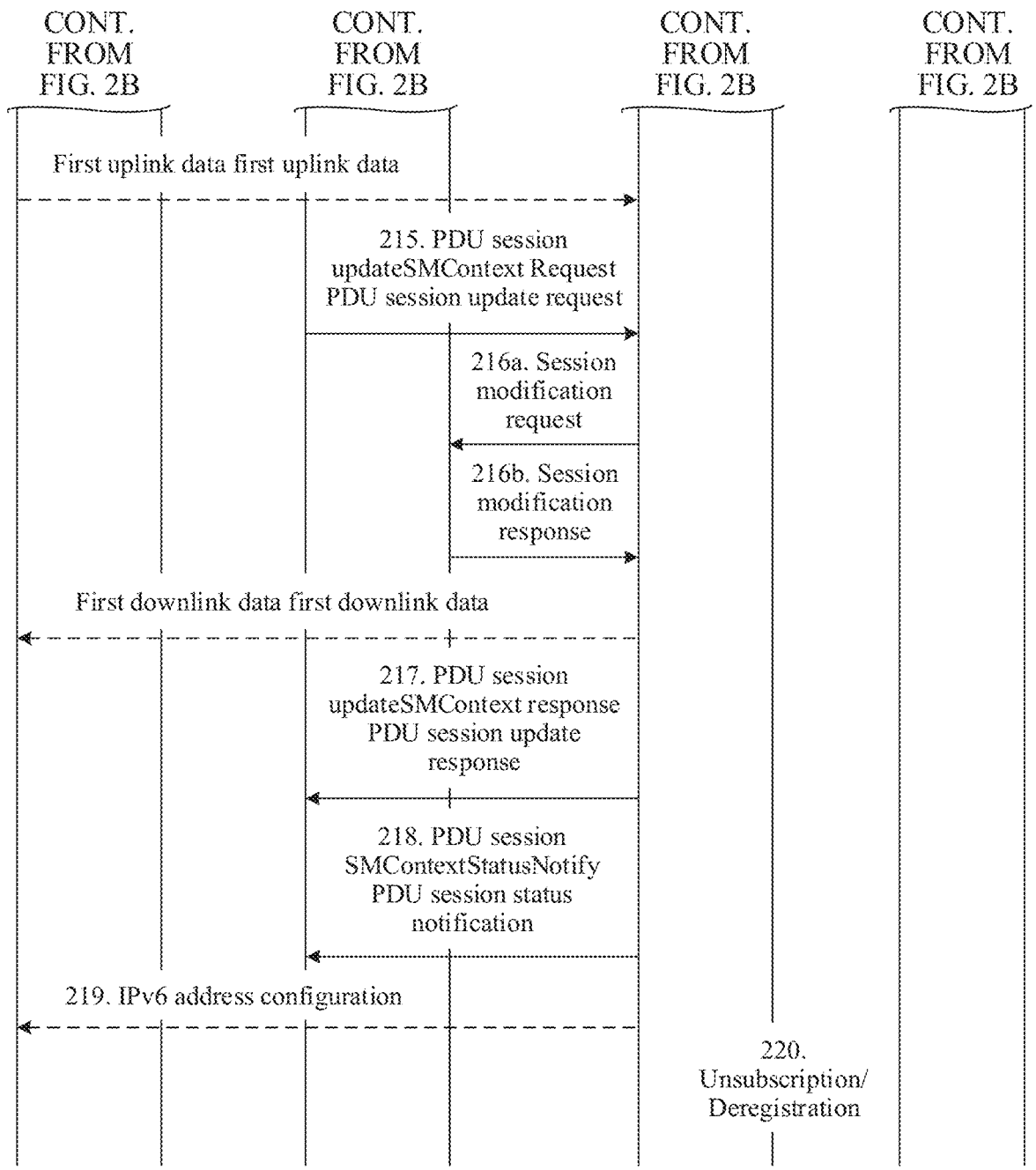

Subsequent steps are similar to step 208 to step 220 in FIG. 2A, FIG. 2B and FIG. 2C, and details are not described herein again.

To resolve a same technical problem, an embodiment of this application further provides a method for implementing a user plane security policy, to meet a user plane requirement of an application. A schematic flowchart of the method may be shown in FIG. 7, and the method includes the following steps.

Step 701. A PCF receives user plane security attribute requirement information that is of an application and that is sent by an AF. The user plane security attribute requirement information is used to indicate a user plane security attribute requirement of the application.

In this embodiment, when providing application information or service information to the PCF, the AF may include the user plane security attribute requirement of the application in the application information or the service information, so that the PCF generates a PCC rule based on the user plane security attribute requirement of the application.

Step 702. The PCF sends user plane security parameter information of the application to an SMF, or sends user plane security parameter information of an SDF of the application to an SMF. The user plane security parameter information is used to indicate a user plane security parameter. The user plane security parameter information is determined based on the user plane security attribute requirement of the application, and is carried in the PCC rule and sent to the SMF.

Step 703. After receiving the user plane security parameter information sent by the PCF, the SMF may bind the PCC to a QoS flow based on the user plane security parameter information.

The binding mechanism is to associate the SDF with QoS. The binding mechanism specifically includes session binding, PCC rule authentication, and QoS flow binding. The QoS flow binding is to map the PCC rule to the QoS flow, and is executed by the SMF.

Specifically, when the SMF determines that a first QoS flow that conforms to the user plane security parameter exists in established QoS flows, the SMF binds the SDF of the application to the first QoS flow; and/or when the SMF determines that a first QoS flow that conforms to the user plane security parameter does not exist in established QoS flows, the SMF requests to establish a second QoS flow, and binds the PCC to the second QoS flow. That is, the second QoS flow conforms to the user plane security parameter.

In the foregoing embodiment, the executed user plane security control policy is at a QoS flow granularity. To be specific, SDFs bound to a same QoS flow have a same user plane security parameter, and different QoS flows in a same PDU session may correspond to different user plane security parameters.

Figure 8:
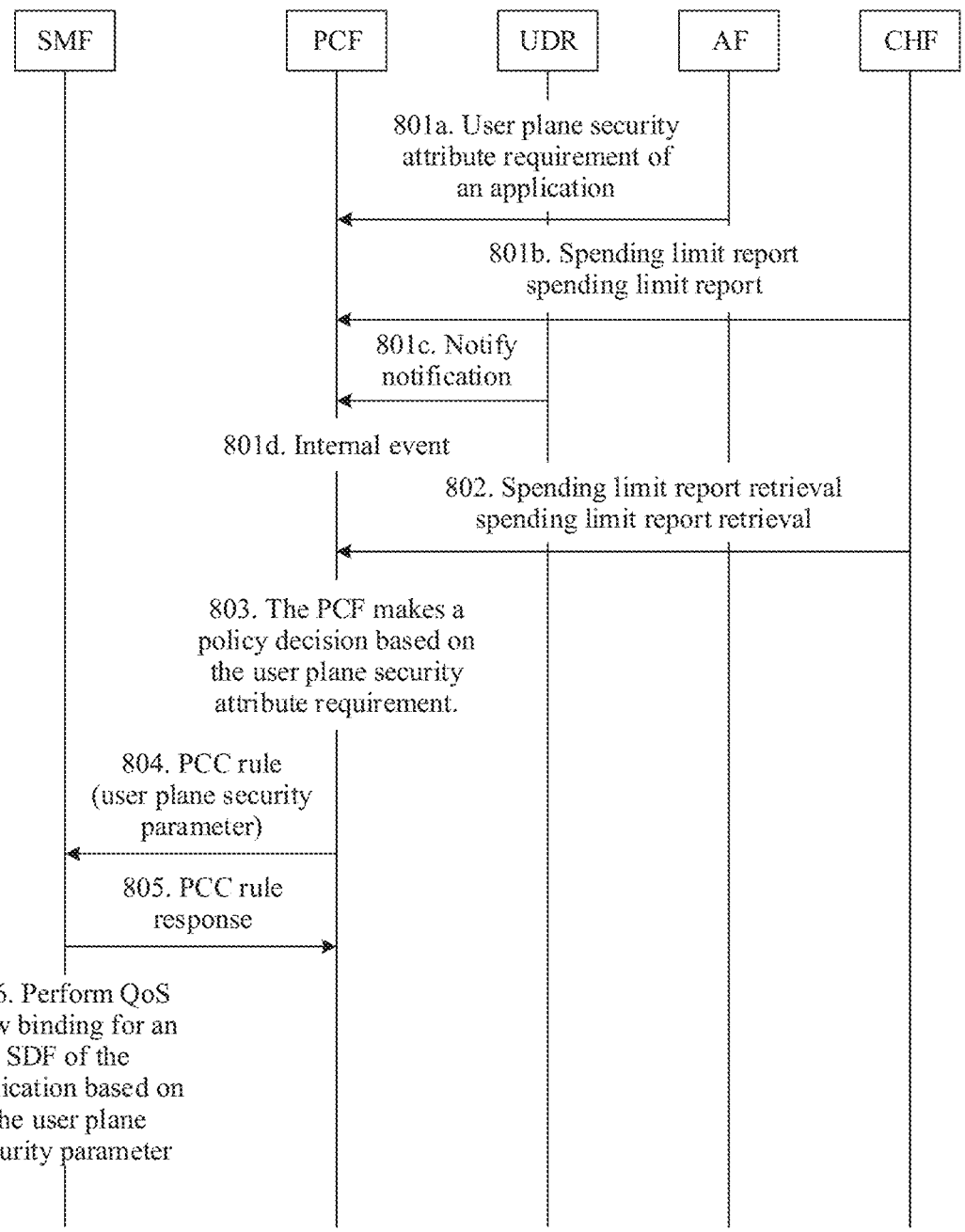
FIG. 8 is a schematic flowchart of another specific embodiment according to an embodiment of this application.

To describe the foregoing embodiments of this application clearly, the following provides detailed descriptions with reference to FIG. 8.

FIG. 8 is a schematic flowchart of an example of a method for implementing a user plane security policy. As shown in the figure, the method may include the following steps.

Step 801a. An AF provides a user plane security attribute requirement of an application to a PCF.

Step 801b. A CHF sends a spending limit report to the PCF.

Step 801c. A UDR sends a notification (notify) to the PCF.

Step 801d. An internal event occurs.

Step 802. Spending limit report retrieval.

Step 801 and step 802 are all steps that may trigger the PCF to make a policy decision, and step 801 is a step closely related to this embodiment of this application.

Step 803. The PCF makes a policy decision based on the user plane security attribute requirement.

Step 804. The PCF sends a PCC rule to an SMF. The PCC rule includes a user plane security parameter determined based on the user plane security attribute requirement, and the PCC rule that carries the user plane security parameter indicates a user plane security tendency of a data flow of an SDF or an application.

Step 805. The SMF sends a PCC rule response to the PCF.

Step 806. The SMF performs QoS flow binding for the SDF of the application based on the user plane security parameter. That is, a QoS flow used to transmit a data packet of the application is a QoS flow that meets the user plane security parameter.

Figure 9:
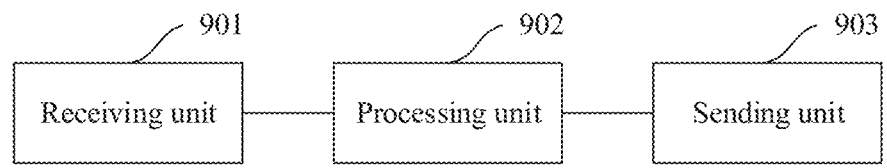
FIG. 9 is a schematic structural diagram of a terminal apparatus according to an embodiment of this application.

Based on a same technical concept, an embodiment of this application further provides a terminal apparatus, configured to implement functions of the terminal apparatus in the foregoing method embodiments. As shown in FIG. 9, the terminal apparatus may include a receiving unit 901 and a processing unit 902, and may further include a sending unit 903.

The receiving unit 901 is configured to receive user plane security indication information sent by a network device. The user plane security indication information is used to indicate a user plane security attribute requirement of an application.

The processing unit 902 associates or establishes a packet data unit PDU session based on the user plane security attribute requirement.

In a possible implementation, the processing unit 902 is specifically configured to, when a PDU session that meets the user plane security attribute requirement of the application does not exist in established PDU sessions, control the sending unit 903 to send PDU session establishment request information, to request to establish a PDU session that meets the user plane security attribute requirement of the application.

In a possible implementation, the PDU session establishment request information includes a user plane security parameter determined based on the user plane security indication information.

In a possible implementation, the processing unit 902 is specifically configured to: when a first PDU session that meets the user plane security attribute requirement of the application exists in established PDU sessions, control the sending unit 903 and the receiving unit 901 to transmit data of the application in the first PDU session.

Based on a same technical concept, an embodiment of this application further provides a PCF, configured to implement functions of the PCF in the foregoing method embodiments. The PCF may include a sending unit, and may further include a processing unit and a receiving unit. A structure of the PCF is similar to the structure shown in FIG. 9.

The sending unit is configured to send user plane security indication information of an application. The user plane security indication information is used by a terminal apparatus to associate or establish a PDU session.

In a possible implementation, the receiving unit is configured to receive a policy rule request sent by a session management function SMF. The request includes user plane security parameter information, and the user plane security parameter information is determined by the terminal apparatus based on the user plane security indication information of the application.

The processing unit is configured to determine user plane security policy information based on the user plane security parameter information.

The sending unit is configured to send the determined user plane security policy information to the SMF.

In a possible implementation, the user plane security indication information of the application is determined by the PCF based on subscription information of the terminal apparatus.

Based on a same technical concept, an embodiment of this application further provides a UDM, configured to implement functions of the UDM in the foregoing method embodiments. The UDM may include a receiving unit, a processing unit and a sending unit. A structure of the UDM is similar to the structure shown in FIG. 9.

The receiving unit is configured to receive PDU session registration information sent by an SMF. The registration information includes a user plane security parameter from a terminal apparatus.

The processing unit is configured to: when the user plane security parameter is a parameter that is permitted to be configured for a PDU session of the terminal apparatus, control the sending unit to send, to the SMF, indication information indicating that the PDU session is permitted to be established; or when the user plane security parameter is not a parameter that is permitted to be configured for a PDU session of the terminal apparatus, control the sending unit to send, to the SMF, indication information indicating that the PDU session is refused to be established.

Figure 10:
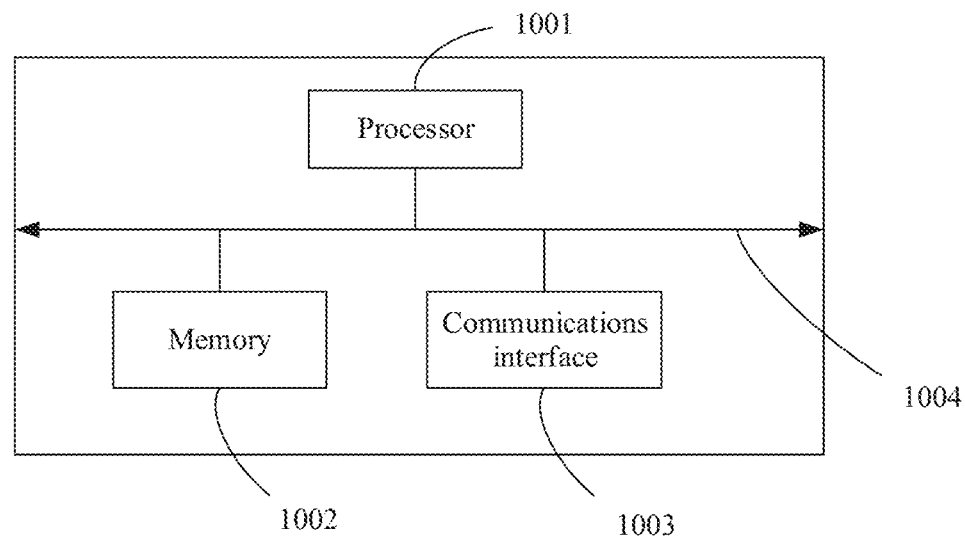
FIG. 10 is a schematic structural diagram of another terminal apparatus according to an embodiment of this application.

Based on a same technical concept, an embodiment of this application further provides a terminal apparatus. The terminal apparatus includes a processor 1001, a memory 1002, and a communications interface 1003, and may further include a communications bus 1004, as shown in FIG. 10.

The memory 1002 is configured to store a program.

The processor 1001 invokes the program stored in the memory 1002 to perform the following steps.

The processor 1001 receives, through the communications interface 1003, user plane security indication information sent by a network device. The user plane security indication information is used to indicate a user plane security attribute requirement of an application.

The processor 1001 associates or establishes a packet data unit PDU session based on the user plane security attribute requirement.

In a possible implementation, the processor 1001 is specifically configured to:

when a PDU session that meets the user plane security attribute requirement of the application does not exist in established PDU sessions, send, through the communications interface 1003, PDU session establishment request information, to request to establish a PDU session that meets the user plane security attribute requirement of the application.

In a possible implementation, the PDU session establishment request information includes a user plane security parameter determined based on the user plane security indication information.

In a possible implementation, the processor 1001 is specifically configured to:

when a first PDU session that meets the user plane security attribute requirement of the application exists in established PDU sessions, transmit, through the communications interface 1003, data of the application in the first PDU session.

Based on a same technical concept, an embodiment of this application further provides a PCF. The PCF includes a processor, a memory, and a communications interface. A structure of the PCF is similar to the structure shown in FIG. 10.

The memory is configured to store a program.

The processor invokes the program stored in the memory to perform the following steps.

The processor sends, through the communications interface, user plane security indication information of an application. The user plane security indication information is used by a terminal apparatus to associate or establish a PDU session.

In a possible implementation, the processor is further configured to:

receive, through the communications interface, a policy rule request sent by a session management function SMF, where the request includes user plane security parameter information, and the user plane security parameter information is determined by the terminal apparatus based on the user plane security indication information of the application;

determine, user plane security policy information based on the user plane security parameter information; and send, through the communications interface, the determined user plane security policy information to the SMF.

In a possible implementation, the user plane security indication information of the application is determined by the PCF based on subscription information of the terminal apparatus.

Based on a same technical concept, an embodiment of this application further provides a UDM. The UDM includes a processor, a memory, and a communications interface.

The memory is configured to store a program.

The processor invokes the program stored in the memory to perform the following steps.

The processor receives, through the communications interface, packet data unit PDU session registration information sent by a session management function SMF. The registration information includes a user plane security parameter from a terminal apparatus.

When the user plane security parameter is a parameter that is permitted to be configured for the PDU session of the terminal apparatus, the processor sends, through the communications interface to the SMF, indication information indicating that the PDU session is permitted to be established.

When the user plane security parameter is not a parameter that is permitted to be configured for the PDU session of the terminal apparatus, the processor sends, through the communications interface to the SMF, indication information indicating that the PDU session is refused to be established.

An embodiment of this application further provides a communications system. The communications system includes any one of the foregoing terminal apparatuses, any one of the foregoing PCFs, and any one of the foregoing UDMs.

Based on a same technical concept, an embodiment of this application further provides a PCF, configured to implement functions of the PCF in the foregoing method embodiments.

Figure 11:
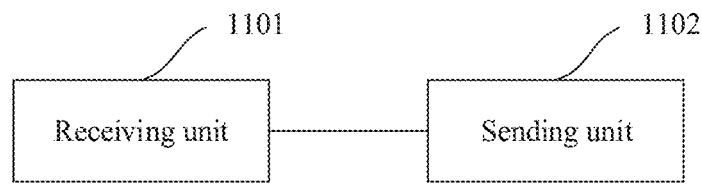
FIG. 11 is a schematic structural diagram of a PCF according to an embodiment of this application.
Figure 7:
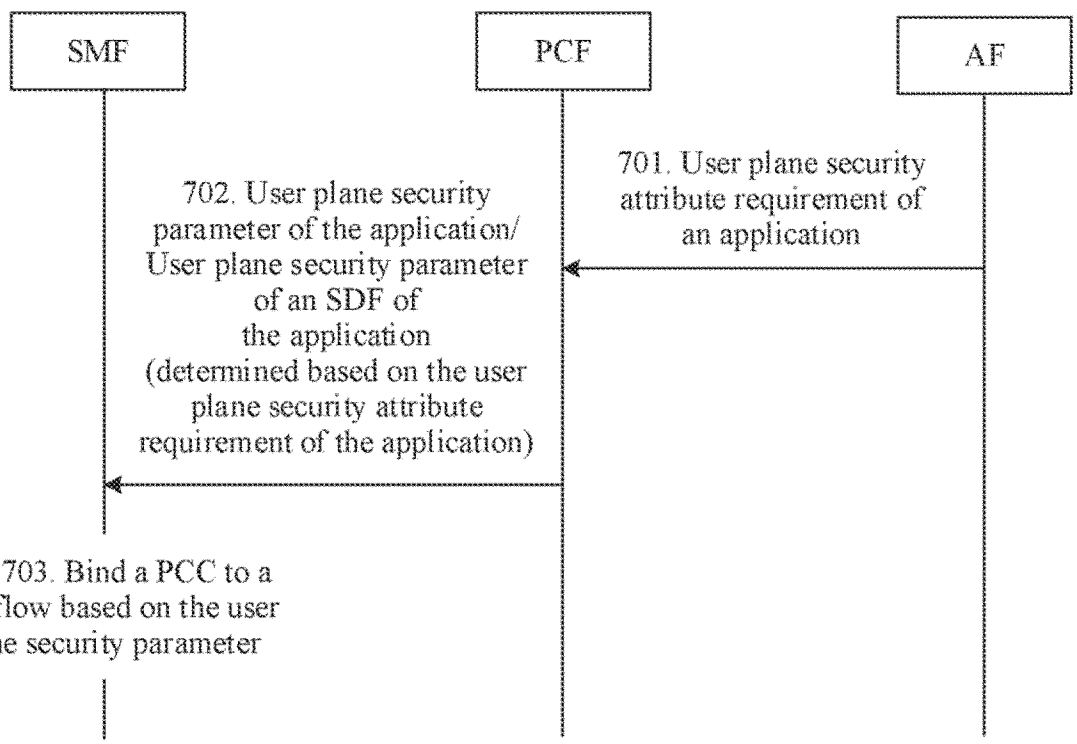

The PCF may include a receiving unit 1101 and a sending unit 1102. A structure of the PCF is similar to the structure shown in FIG. 11.

The receiving unit 1101 is configured to receive user plane security attribute requirement information that is of an application and that is sent by an application function AF. The user plane security attribute requirement information is used to indicate a user plane security attribute requirement of the application.

The sending unit 1102 is configured to send user plane security parameter information of an SDF to a session management function SMF. The user plane security parameter information of the SDF is determined based on the user plane security attribute requirement of the application.

Based on a same technical concept, an embodiment of this application further provides an SMF, configured to implement functions of the SMF in the foregoing method embodiments. A PCF may include a receiving unit and a processing unit, and may further include a sending unit. A structure of the PCF is similar to the structure shown in FIG. 9.

The receiving unit is configured to receive user plane security parameter information that is of an SDF and that is sent by a policy control function PCF. The user plane security parameter information of the SDF is included in a PCC, the user plane security parameter information of the SDF is determined based on a user plane security attribute requirement of an application, and the user plane security parameter information is used to indicate a user plane security parameter.

The processing unit is configured to bind the PCC to a quality of service flow QoS flow based on at least the user plane security parameter of the SDF.

In a possible implementation, the processing unit is specifically configured to:

when a first QoS flow that conforms to the user plane security parameter exists in established QoS flows, bind the SDF of the application to the first QoS flow; and/or when a first QoS flow that conforms to the user plane security parameter does not exist in established QoS flows, request, through the sending unit, to establish a second QoS flow, and the second QoS flow conforms to the user plane security parameter.

Based on a same technical concept, an embodiment of this application further provides a PCF. The PCF includes a processor, a memory, and a communications interface, configured to implement functions of the PCF in the foregoing method embodiments. A structure of the PCF is similar to the structure shown in FIG. 10.

The memory is configured to store a program.

The processor invokes the program stored in the memory to perform the following steps.

The processor receives, through the communications interface, user plane security attribute requirement information that is of an application and that is sent by an application function AF. The user plane security attribute requirement information is used to indicate a user plane security attribute requirement of the application.

The processor sends, through the communications interface, user plane security parameter information of an SDF to a session management function SMF. The user plane security parameter information of the SDF is determined based on the user plane security attribute requirement of the application.

Based on a same technical concept, an embodiment of this application further provides an SMF. The SMF includes a processor, a memory, and a communications interface, configured to implement functions of the SMF in the foregoing method embodiments. A structure of the SMF is similar to the structure shown in FIG. 10.

The memory is configured to store a program.

The processor invokes the program stored in the memory to perform the following steps.

The processor receives, through the communications interface, user plane security parameter information that is of an SDF and that is sent by a policy control function PCF. The user plane security parameter information of the SDF is included in a PCC, the user plane security parameter information of the SDF is determined based on a user plane security attribute requirement of an application, and the user plane security parameter information is used to indicate a user plane security parameter.

The processor binds the PCC to a quality of service flow QoS flow based on at least the user plane security parameter of the SDF.

In a possible implementation, the processor is specifically configured to:

when a first QoS flow that conforms to the user plane security parameter exists in established QoS flows, bind the SDF of the application to the first QoS flow; and/or when a first QoS flow that conforms to the user plane security parameter does not exist in established QoS flows, request, through the communications interface, to establish a second QoS flow, and the second QoS flow conforms to the user plane security parameter.

An embodiment of this application further provides a communications system. The communications system includes any one of the foregoing PCFs and any one of the foregoing SMFs.

An embodiment of this application provides a computer-readable storage medium. The computer-readable storage medium stores a computer instruction. When the instruction is run on a computer, the computer is enabled to perform functions of the terminal apparatus, the PCF, the UDM, or the SMF in the foregoing method embodiments.

An embodiment of this application provides a computer program product including an instruction. When the computer program product runs on a computer, the computer is enabled to perform functions of the terminal apparatus, the PCF, the UDM, or the SMF in the foregoing method embodiments.

Tis application provides a chip. The chip is connected to a memory, and is configured to read and execute a software program stored in the memory, to implement functions of the terminal apparatus, the PCF, the UDM, or the SMF in the foregoing method embodiments.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer usable storage media (including but not limited to a magnetic disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of the process and/or the block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded on the computer or another programmable data processing device, so that a series of operation steps are performed on the computer or the another programmable device to produce processing implemented by the computer. Therefore, the instructions executed on the computer or the another programmable device provide steps for implementing the specific function in the one or more processes in the flowcharts and/or in the one or more blocks in the block diagrams.

Clearly, a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A method for implementing a user plane security policy, comprising:
   receiving, by a terminal apparatus having connectivity to a communication network based on subscription information of the terminal apparatus, user plane security indication information sent by a network device of the communication network, wherein the user plane security indication information indicates a user plane security attribute requirement of an application; and
   associating or establishing, by the terminal apparatus, a protocol data unit (PDU) session based on the user plane security attribute requirement, wherein in response to determining a PDU session that meets the user plane security attribute requirement of the application does not exist in established PDU sessions, the terminal apparatus sends PDU session establishment request information comprising a user plane security parameter determined based on the user plane security indication information to request to establish a new PDU session that meets the user plane security attribute requirement of the application.

2. The method according to claim 1, wherein the terminal apparatus chooses the PDU session based on the user plane security attribute requirement, and the method further comprises:
   in response to determining a first PDU session that meets the user plane security attribute requirement of the application exists in established PDU sessions, transmitting, by the terminal apparatus, data of the application in the first PDU session.

3. A method for implementing a user plane security policy, comprising:
   sending, by a policy control function apparatus, user plane security indication information of an application to a terminal apparatus having connectivity to a communication network based on subscription information of the terminal apparatus, wherein the user plane security indication information indicates a user plane security attribute requirement of the application and is used by the terminal apparatus to associate or establish a protocol data unit (PDU) session; and
   in response to receiving PDU session establishment request information comprising user plane security parameter information determined based on the user plane security information, the PDU session establishment request information being sent to by the terminal apparatus in response to a PDU session that meets the user plane security attribute of the application being determined to not exist, processing the PDU session establishment request information to establish a new PDU session that meets the user plane security attribute requirement of the application.

4. The method according to claim 3, further comprising:
   sending, by a session management function apparatus, a policy rule request to the policy control function apparatus, wherein the policy rule request comprises the user plane security parameter information, and the user plane security parameter information is determined by the terminal apparatus based on the user plane security indication information of the application;
   determining, by the policy control function apparatus, user plane security policy information based on the user plane security parameter information; and
   sending, by the policy control function apparatus, the determined user plane security policy information to the session management function apparatus.

5. The method according to claim 3, wherein the user plane security indication information of the application is determined by the policy control function apparatus based on the subscription information of the terminal apparatus.

6. A terminal apparatus, comprising a processor, a memory, and a communications interface, wherein
   the memory is configured to store a program; and
   the processor invokes the program stored in the memory to perform the following steps:
   receiving, through the communications interface, user plane security indication information sent by a network device of a communication network, wherein the terminal apparatus has connectivity to the communication network based on subscription information of the terminal apparatus, and the user plane security indication information indicates a user plane security attribute requirement of an application; and
   associating or establishing a protocol data unit (PDU) session based on the user plane security attribute requirement, wherein in response to determining a PDU session that meets the user plane security attribute requirement of the application does not exist in established PDU sessions, the terminal apparatus sends PDU session establishment request information comprising a user plane security parameter determined based on the user plane security indication information to request to establish a new PDU session that meets the user plane security attribute requirement of the application.

7. The terminal apparatus according to claim 6, wherein the terminal apparatus is further configured to:

in response to determining a first PDU session that meets the user plane security attribute requirement of the application exists in established PDU sessions, transmit, through the communications interface, data of the application in the first PDU session.

* * * * *

UNITED STATES PATENT AND TRADEMARK OFFICE
CERTIFICATE OF CORRECTION

PATENT NO. : 12,058,139 B2
APPLICATION NO. : 17/174749
DATED : August 6, 2024
INVENTOR(S) : Haiyang Sun et al.

Page 1 of 2

It is certified that error appears in the above-identified patent and that said Letters Patent is hereby corrected as shown below:

In the Drawings

Figure 7:
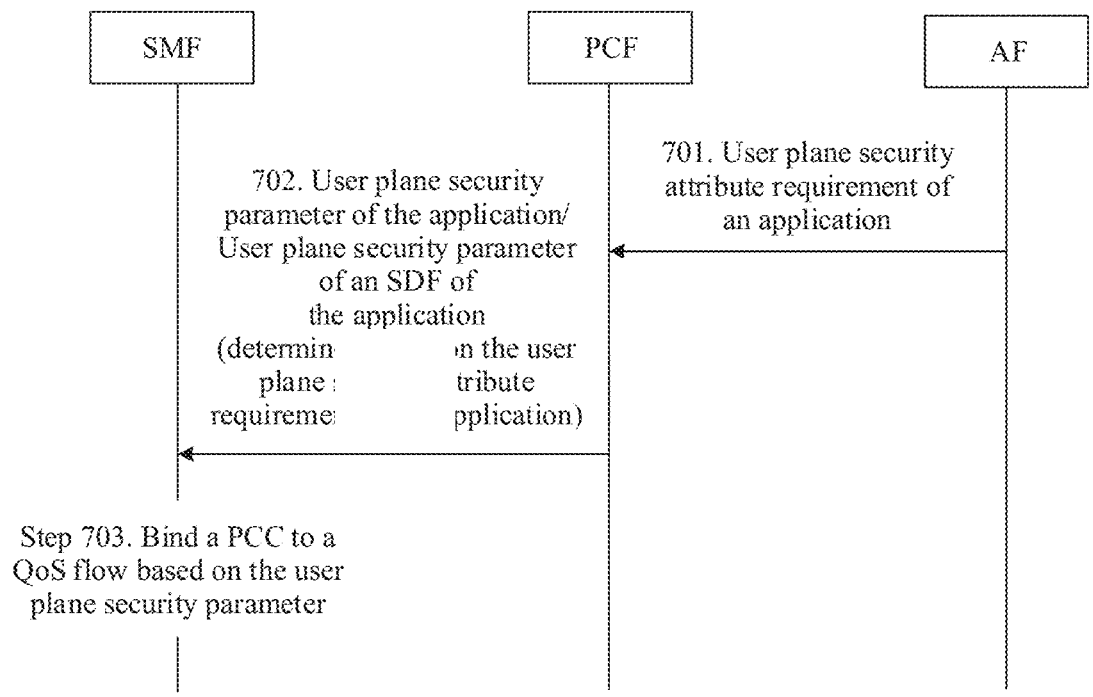
FIG. 7 is a schematic flowchart of another method for implementing a user plane security policy according to an embodiment of this application.

The original Fig. 7 should replace the Fig. 7, as shown on the attached page.

Signed and Sealed this
Twenty-seventh Day of May, 2025

Coke Morgan Stewart
*Acting Director of the United States Patent and Trademark Office*